3,296,282
OXIDATION OF HYDROCARBONS

Ralph O. Kerr, Houston, Tex., assignor to Petro-Tex Chemical Corporation, Houston, Tex., a corporation of Delaware
No Drawing. Filed Mar. 5, 1964, Ser. No. 349,765
7 Claims. (Cl. 260—346.8)

This invention relates to improvements in the preparation of dicarboxylic acid anhydrides by the vapor phase oxidation of hydrocarbons and more particularly relates to improvements in the process for the catalytic oxidation of hydrocarbons to dicarboxylic anhydrides in the presence of a vanadium-phosphorus-oxygen catalyst.

It has recently been discovered that high yields of dicarboxylic anhydrides may be obtained by oxidizing hydrocarbons in the vapor phase in contact with a vanadium-phosphorus-oxygen catalyst. Although high yields of dicarboxylic anhydrides have been obtained by such processes, it has been found that the yield of product diminishes with time. It is an object of this invention to provide a method whereby the catalyst may be reactivated and whereby the high yields may be maintained. It has been found that one reason for the decrease in yield is the deactivation of a portion of the catalyst particles. It is also an object of this invention to selectively activate the deactivated catalyst particles without impairing the activity of the remaining catalyst particles. According to this invention it has been discovered that the vanadium-phosphorus-oxygen catalyst may be reactivated and stabilized by adding to the catalyst an organo-phosphorus compound selected from the group consisting of

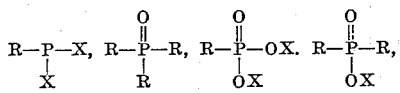

and

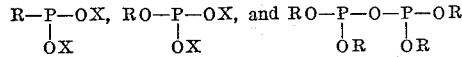

wherein R is phenyl or an alkyl radical of one to 6 carbon atoms and X is H or R. Sulphur may be substituted for oxygen in any of these formulas. Suitable compounds are such as the primary, $RPH_2$, secondary, $R_2PH$, and tertiary, $R_3P$, phosphines such as ethyl phosphine; the tertiary phosphine oxides, $R_3PO$, such as tripropyl phosphine oxide; the primary, $RP(O)(OX)_2$, and secondary, $R_2P(O)OX$, phosphonic acids such as benzene phosphonic acid; the esters of the phosphonic acids such as diethyl methanephosphonate; the phosphonous acids, $RPO_2X_2$, such as benzenephosphonous acid and the esters thereof such as the monoethyl ester; the phosphinous acids, $R_2POX$, such as diethyl phosphinous acid and the esters thereof such as the monoethyl ester; the primary, $ROP(OX)_2$, secondary, $(RO)_2POX$, and tertiary, $(RO_3)P$, phosphites such as diethyl phosphite, trimethyl phosphite, triethyl phosphite, triisopropyl phosphite, tripropyl phosphite and tributyl phosphite, and the pyrophosphites such as tetraethyl pyrophosphite.

The vanadium-phosphorus-oxygen catalysts to be reactivated according to this invention comprise vanadium, phosphorus and oxygen combined as a complex. The over-all ratio of vanadium to phosphorus in the catalyst bed to be activated will have an atomic ratio of about ½ to 3 atoms of phosphorus per atom of vanadium. The vanadium-phosphorus-oxygen catalyst may also contain various stabilizers and metal additives, generally in percents of less than 15 weight percent based on the total weight of vanadium and phosphorus. The atomic ratio of oxygen to the remaining components of the catalyst, when the catalyst is in the process of being used to catalyze the oxidation is difficult to determine and is probably not constant due to the competing reactions of oxidation and reduction taking place during the reduction at high temperatures. The overall ratio of oxygen to the combined atoms of vanadium and phosphorus at room temperature would be such as about 4 to 10 atoms of oxygen per the combined atoms of vanadium and phosphorus. At any rate the catalyst is present during the reaction as an oxide of vanadium and phosphorus.

The vanadium-phosphorus-oxygen catalyst may be prepared in a number of ways. The catalyst may be prepared by precipitating the vanadium and phosphorus compound, either with or without a carrier, from a colloidal dispersion of the ingredients in an inert liquid. The catalyst may also be prepared by dissolving vanadium and phosphorus compounds in a common solvent, such as hot oxalic acid and thereafter depositing the solution on a carrier. In some instances, the catalyst may be deposited as molten metal compounds on a carrier; however, care must be taken not to vaporize off any of the ingredients. The catalyst may also be prepared by heating and mixing anhydrous forms of phosphorus acids with vanadium compounds.

One method for the catalyst preparation is to mix with heating at a temperature of about 100° C. to 600° C. anhydrous phosphoric acid such as orthophosphoric acid, pyrophosphoric acid, triphosphoric acid or metaphosphoric acid, with a vanadium compound such as vanadium pentoxide or ammonium metavanadate. After the exothermic reaction between the ingredients has taken place, the catalyst may be used. The reaction mixture may be formed on carriers or shaped in the form such as pellets, prior to the reaction to form the catalyst. Another example for the preparation of the catalyst is to dissolve a vanadium compound such as ammonium metavanadate or vanadium pentoxide in an aqueous solution of phosphoric acid. After the components have been dissolved, the solution is heated until precipitation occurs. The precipitant can then be dried and used as a catalyst, or a carrier may be combined with a liquid phase either before or after the precipitation.

In the various methods of preparation of the vanadium-phosphorus-oxygen catalyst, any vanadium and phosphorus compounds may be used as starting materials, which when the compounds are combined and heated to dryness in air at a temperature of, for example, 350° C. will leave as a deposit a catalyst complex having relative proportions within the described ranges. Of course, certain methods of catalyst preparation are preferred. As a source of phosphorus, various phosphorus compounds may be used, such as metaphosphoric acid, triphosphoric acid, pyrophosphoric acid, orthophosphoric acid, phosphorus pentoxide, phosphorus oxyiodide, ethyl phosphate, methyl phosphate, amine phosphate, phosphorus pentachloride, phosphorus trichloride, phosphorus oxybromide and the like. Suitable vanadium compounds useful as starting materials are compounds such as vanadium pentoxide, ammonium metavanadate, vanadium trioxide, vanadyl trichloride, vanadium sulfate, vanadium phosphate, vanadium tribromide, vanadium formate, metavanadic acid, pyrovanadic acid, and the like.

The process of this invention is applicable generally to processes for the oxidation of hydrocarbons to dicarboxylic acids in the presence of vanadium-phosphorus-oxygen catalysts. However, the process is particularly applicable to processes for the preparation of maleic anhydride, and especially the preparation of maleic anhydride from olefins. The oxidation of the hydrocarbon to aliphatic dicarboxylic anhydrides may be accomplished by contacting low concentrations of hydrocarbon in oxygen in contact with the vanadium-phosphorus-oxygen catalyst. Air is the most economical source of oxygen, but mixtures of oxygen and diluent gases, such as nitrogen, may also be employed. Air streams enriched with oxygen may also be used. The gaseous feed stream to the reactor normally will contain about 0.3 to about 3.0 mol percent hydrocarbons based on the total gaseous stream. About 0.75 to about 2.0 mol percent of the hydrocarbon generally gives optimum yield of product, although higher and lower concentrations may be utilized. The flow rate of the gaseous stream to the reactor may be varied within fairly wide limits, but a preferred range is at the rate of about 50 to 500 grams of hydrocarbon per liter of catalyst per hour, and generally will be within the range of about 75 to 350 grams of hydrocarbon per liter of catalyst per hour. Residence time of the gas stream will normally be less than about 5 seconds, such as from about 0.01 to less than 2 seconds. The best results have been obtained at residence times of less than 1 second. The flow rates and residence times are calculated at standard conditions of 760 mm. of mercury and at 25° C. The preferred hydrocarbon feeds are aliphatic hydrocarbons and especially preferred are the monoolefins of 4 to 6 carbon aotms, wherein the molecule has a straight chain of at least 4 carbon atoms. Best results have been obtained by feeding butene, with butene-2 being particularly preferred. Other useful feedstocks are such as 3-methyl-butene-1, isoprene, 2,3-dimethyl butadiene and butadiene-1,3 and mixtures thereof.

The temperature of reaction for the oxidation of the hydrocarbon to dicarboxylic anhydrides may be varied. The temperature of reaction will depend to some extent upon the size of the reactor, the hydrocarbon concentration and the particular vanadium-phosphorus-oxygen catalyst being employed. A suitable temperature of reaction is from about 350° C. to about 575° C., as measured at the maximum temperature in the reactor. Better results have been obtained at temperatures from 375 to 525° C. The pressure on the reactor is not generally critical, and the reaction may be conducted at atmospheric, superatmospheric, or below atmospheric pressure.

The oxidation of the hydrocarbons to dicarboxylic anhydrides in the presence of a vanadium-phosphorus-oxygen catalyst may be conducted in a variety of reactors. Fixed bed reactors used for the production of maleic anhydride are quite satisfactory. Multiple tube heat exchanger type reactors have been successfully used. Because the reaction is exothermic, the heat generated must be conducted away from the reactor. Normally, the reactors contain a preheat zone of an inert material. Catalyst support may be used to give the catalyst physical strength and stability. The carrier may vary in size but generally is from about 2½ mesh to about 10 mesh in the Tyler Standard Screen size. Useful carriers are such as the inert alumina carriers or the silicon carbides. The amount of the vanadium-phosphorus-oxygen catalysts on the carrier is usually in the range of about 10 to about 35 weight percent of the total weight of complex plus carrier. The final particle size of the catalyst particles will also preferably be about 2½ to about 10 mesh size. The final catalyst particles may be of a variety of shapes, with the preferred shape being the shape of cylinders or spheres or irregular spheres. Inert diluents such as silica may be present in the catalytic surface, but the combined weight of the vanadium, phosphorus and oxygen will preferably be at least 50 weight percent of the catalytic surface.

The organo-phosphorus compounds to be added to the vanadium-phosphorus-oxygen catalysts according to this invention have a formula selected from the group consisting of

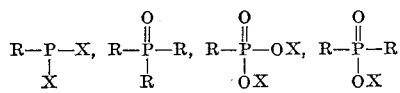

and

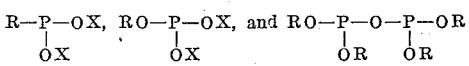

wherein R is phenyl or an alkyl radical of one to 6 carbon atoms and X is H or R. Suitable compounds are such as the primary, $RPH_2$, secondary, $R_2PH$, and tertiary, $R_3P$, phosphines such as ethyl phosphine; the tertiary phosphine oxides, $R_3PO$, such as tripropyl phosphine oxide; the primary, $RP(O)(OX)_2$, and secondary, $R_2P(O)OX$, phosphonic acids such as benzene phosphonic acid; the esters of the phosphonic acids such as diethyl methanephosphonate; the phosphonous acids, $RPO_2X_2$, such as benzenephosphonous acid and the esters thereof such as the monoethyl ester; the phosphinous acids, $R_2POX$, such as diethyl phosphinous acid and the esters thereof such as the monoethyl ester; the primary, $ROP(OX)_2$, secondary, $(RO)_2POX$, and tertiary, $(RO)_3P$, phosphites such as diethyl phosphite, trimethyl thiophosphite, triethyl phosphite, triisopropyl phosphite, tripropyl phosphite and tributyl phosphite, and the pyrophosphites such as tetraethyl pyrophosphite. Preferred phosphorus compounds are those wherein the phosphorus has a valence of less than plus five. The preferred types of phosphorus compounds are the phosphines, phosphine oxides, phosphinites, phosphinite esters, the dialkyl phosphites, the trialkyl phosphites, the tetraalkyl pyrophosphites and mixtures thereof. The organo phosphorus compounds will suitably have a boiling point of no greater than 250° C. and preferably will have a boiling point of no greater than 200° C.

Excellent results have ben obtained with the phosphites such as the primary, secondary, and tertiary phosphites and thiophosphites such as dimethyl hydrogen phosphite, trimethyl phosphite, triisopropyl phosphite, tributyl phosphite, diethyl thiophosphite, triphenyl phosphite, and tetramethyl pyrophosphite. Particularly preferred phosphites are dimethyl hydrogen phosphite and trimethyl phosphite, and it is one of the features of this invention that improved results are obtained by using the combination of dimethyl hydrogen phosphite and trimethyl phosphite to obtain results superior to that achieved with either of the single phosphites.

The organo-phosphorus compounds can be added to the vanadium-phosphorus-oxygen catalysts in a number of different ways. Preferably the vanadium-phosphorus-oxygen catalyst will first be used for the oxidation of hydrocarbons to dicarboxylic anhydride for a period of time until the yield of dicarboxylic anhydride diminishes. The organo-phosphorus compound may then be added to reactivate the catalyst. The reactivation step may be accomplished either with or without the flows of hydrocarbon and/or oxygen continued. However, best results have been obtained by adding the organo-phosphorus compound after the hydrocarbon flow has been discontinued, but with a continuation of the oxygen flow. After the organo-phosphorus compound has been added to the catalyst, better results have been obtained by blowing the reactivated catalyst with air prior to the re-introduction of the hydrocarbons.

Another method for the reactivation of the vanadium-phosphorus-oxygen catalyst is by the continuous or intermittent addition of the organo-phosphorus compounds to the gaseous stream of hydrocarbons and oxygen-containing gases entering the reactor. By such a technique, the activity of the vanadium-phosphorus-oxygen catalyst is maintained through continuous reactivation or stabilization. An advantage of this procedure is that the production of dicarboxylic anhydride does not have to be interrupted. The addition of the organo-phosphorus compound may be thought of as a stabilizer for the vanadium-phosphorus-oxygen catalyst as well as a reactivator for the catalyst.

Still another method for the addition of the organo-phosphorus compound to the vanadium-phosphorus-oxygen catalyst is by the addition of the organo-phosphorus compound in liquid phase by pouring the organo-phosphorus compound over the catalyst to be reactivated. Reactivation by this technique may suitably be performed at about room temperature if desired.

Thus, the organo-phosphorus compound may be added to the vanadium-phosphorus-oxygen catalyst by a variety of methods such as adding the organo-phosphorus compound as a liquid or gas. Other techniques such as the use of an aerosol to convey the organo-phosphorus compound are also satisfactory. Suspensions or collodial solutions of the organo-phosphorus compounds may be employed. Solvents for the organo-phosphorus compound may be included. The organo-phosphorus composition compound may be added such as to the hydrocarbon, the oxygen containing gas or via a diluent gas such as nitrogen. The over-all temperature range for the addition of the organo-phosphorus compound suitably will be from about 0° C. to 600° C., depending upon the particular compound selected. However, the preferred temperature of the vanadium-phosphorus-oxygen catalyst at the time of addition of the organo-phosphorus-compound will be at least 325° C. with still better results being obtained at a catalyst temperature of at least 375° C. The upper limits of the temperature of the catalyst during reactivation will suitably be about 550° C., or 600° C., or perhaps higher for momentary periods of time. The pressure during the addition may be atmospheric, subatmospheric or super-atmospheric. The conditions of concentration, temperature and pressure should be adjusted to permit optimum contact of the organo-phosphorus compound with the vanadium-phosphorus-oxygen catalyst.

The amount of organo-phosphorus compound added may be varied depending upon such factors as the age of the catalyst, the temperature at which the catalyst has been operated, the composition of the vanadium-phosphorus-oxygen catalyst and so forth. When the organo-phosphorus compound is continuously added to the gaseous stream entering the reactor, the quantity is generally relatively small such as at least about 0.0001 mol of organo-phosphorus compound added per gram atom of vanadium in the catalyst per day, such as at an average rate of 0.00043 gram mol per day per gram atom of vanadium, or based on the hydrocarbon entering the reactor about 0.000005 to 0.0001 mol of the organo-phosphorus compound per mol of hydrocarbon. Preferred amounts are about 0.00001 to 0.00005 mol of the organo-phosphorus compound per mol of the hydrocarbon such as butene. As pointed out above, the addition may be either intermittent or continuous. Of course, even if the organo-phosphorus compound is added continuously, it is not necessary to add the organo-phosphorus compound at a constant rate. In the preferred method of reactivating the catalyst wherein the hydrocarbon flow is stopped, the amount of organo-phosphorus compound added will generally be from about 0.01 to 0.30 gram mol of organo-phosphorus compound per gram atom of vanadium in the catalyst, and preferably will be from or about 0.02 to 0.10 gram mol of organo-phosphorus compound per gram atom of vanadium in the catalyst.

It has been found that by utilizing the process of this invention the deactivated catalyst particles are selectively activated. Another advantage of the invention is that a fixed catalyst bed containing a preheat zone of inert particles may be activated without removing the preheat zone or the catalyst particles from the reactor. The reactivation procedure does not cause the catalyst bed to be plugged.

*Example 1*

Butene-2 was oxidized to maleic anhydride in a 1.06 inch carbon steel, nine foot long reactor. The reactor was cooled by a salt bath. A mixture of 1.0 mol percent butene-2 in air was fed to the reactor. The flow rate was 85 grams of butene-2 per liter of catalyst per hour. The catalyst comprised an oxide of vanadium and phosphorus wherein the atomic ratio of phosphorus to vanadium was 1.43. The actives were supported on an inert carrier. The catalyst gave a maximum yield of 91 weight percent maleic anhydride after 1500 hours at a throughput of 5.52 pounds of butene per tube per day. The reactor temperature at this time was 427° C. After 5600 hours of operation the yield had dropped to 63 weight percent maleic anhydride, together with an increased amount of CO and $CO_2$. After 5800 hours of operation, the catalyst was reactivated. The butene feed to the reactor was stopped. The catalyst was held at 440° C., and 35 liters per minute of air saturated with water vapor was passed over the catalyst. To this stream was added 35 liters per minute of an air stream saturated with dimethyl hydrogen phosphite. A total of 25 ml. of dimethyl hydrogen phosphite was added in this manner over a 2 hour period. Air was then blown over the catalyst for 2 hours before butene was reintroduced. After 6450 total hours of operation the yield of maleic anhydride was 83 percent, and the percent CO and $CO_2$ had dropped significantly. After 7450 total hours of operation, an additional 10 ml. of dimethyl hydrogen phosphite was added in the same manner as the original addition to reactivate the catalyst. After 8500 total hours of operation an additional 10 ml. of dimethyl hydrogen phosphite was added in the same manner to again reactivate the catalyst. After 8800 hours of operation the catalyst was producing a yield of 74 weight percent maleic anhydride.

*Example 2*

Butene-2 was oxidized to maleic anhydride in a 1.06 inch carbon steel, nine-foot long reactor. The reactor was cooled by a salt bath. A mixture of 0.91 mol percent butene-2 in air was fed to the reactor. The flow rate was 62 grams of butene-2 per liter of catalyst per hour. The catalyst comprised an oxide of vanadium and phosphorus wherein the atomic ratio of phosphorus to vanadium was 1.25. The actives were supported on an inert carrier. The catalyst gave a maximum yield of 86 weight percent maleic anhydride after 850 hours of operation. The reactor temperature at this time was 431° C. After 1950 hours the yield had dropped to 59 weight percent maleic anhydride, together with large amounts of CO and $CO_2$. After 2000 hours of operation, the catalyst was reactivated. The butene and air feed to the reactor was stopped. The catalyst was held at room temperature and 110 ml. of dimethyl hydrogen phosphite was poured onto the catalyst in the reactor. After the phosphite was absorbed to a depth of approximately 4 feet, air was passed through the system while the reactor was heated to 300° C. After 3700 total hours of operation the yield of maleic anhydride was 80 weight percent, and the mol percent of CO and $CO_2$ had dropped. After 4100 hours of operation the catalyst was producing a yield of 76 weight percent maleic anhydride.

*Example 3*

Butene-2 was oxidized to maleic anhydride in a 1.06 inch I.D. salt-cooled reactor. The catalyst contained 1.45 atoms of phosphorus per atom of vanadium and was coated on $3/16 \times 3/16$ inch pellets. The reactor contained 1345 grams of catalyst. The maximum yield of maleic anhydride was 84 weight percent obtained at a reactor temperature of about 450° C. at 600 hours of operation. After about 1200 hours of operation, the yield of maleic anhydride had dropped to about 54 weight percent. At 1700 hours of operation the catalyst was reactivated with trimethylphosphite. 26.2 grams of trimethylphosphite was added in the vapor phase as a 0.25 mol percent trimethylphosphite composition in air, with the air flow remaining at 86 liters per minute (S.T.P.) The trimethylphosphite was fed in over a 2 hour period. During this period the hydrocarbon flow was discontinued and the catalyst was retained at the reactor temperature. After 2000 hours of operation, the yield of maleic anhydride was 78 weight percent.

*Example 4*

The same reactor was used as in Example 3. The catalyst contained 1.3 atoms of phosphorus per atom of vanadium, with the catalytic surface being coated on ¼ inch carriers. The total weight of the catalyst plus carrier was 1198 grams and the reactor temperature was about 460° C. The maximum yield of maleic anhydride from butene-2 was about 90 weight percent. After 8,000 hours of operation, the yield of maleic anhydride had dropped to about 65 weight percent. At 8600 hours of operation 10.4 grams of trimethyl phosphite was added. The trimethyl phosphite was added as a 0.20 mol percent trimethyl phosphite composition in air. From 8800 to 9100 hours of operation, the yield of maleic anhydride was 73 weight percent.

When Example 4 was repeated using tributyl phosphite, diethyl thiophosphate, tetramethyl pyrophosphite or triphenyl phosphite, excellent results were obtained.

I claim:

1. In a process for the vapor phase oxidation of hydrocarbons of 4 to 6 carbon atoms to maleic anhydride wherein the said hydrocarbon is contacted with a vanadium-phosphorus-oxygen catalyst wherein the said catalyst gradually decreases in activity, the improvement which comprises adding to the said catalyst an organo-phosphorus compound selected from the group consisting of

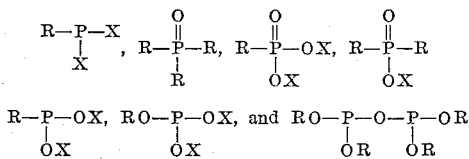

wherein R is phenyl or an alkyl radical of one to 6 carbon atoms and X is H or R.

2. The process of oxidizing a hydrocarbon of 4 to 6 carbon atoms to maleic anhydride which comprises contacting a gaseous mixture of said hydrocarbon and oxygen at an elevated temperature in contact with a vanadium-phosphorus-oxygen catalyst having an atomic ratio of ½ to 3 atoms of phosphorus per atom of vanadium and whereby the yield of maleic anhydride diminishes with time, the improvement which comprises adding to the said catalyst an organo-phosphorus compound selected from the group consisting of

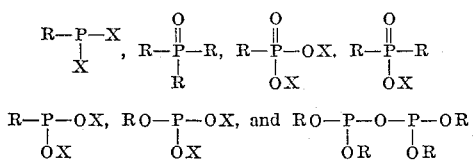

wherein R is phenyl or an alkyl radical of one to 6 carbon atoms and X is H or R while maintaining the said catalyst at a temperature of 300 to 550° C.

3. In a process for the vapor phase oxidation of a hydrocarbon of 4 to 6 carbon atoms to maleic anhydride wherein the said hydrocarbon is contacted with a vanadium-phosphorus-oxygen catalyst in the form of discrete particles with the over-all catalytic surface having an atomic ratio of about ½ to 3 atoms of phosphorus per atom of vanadium and wherein said catalyst gradually decreases in activity, the improvement which comprises substantially discontinuing the flow of said hydrocarbon and adding in the presence of oxygen to the said catalyst an organo-phosphorus compound selected from the group consisting of

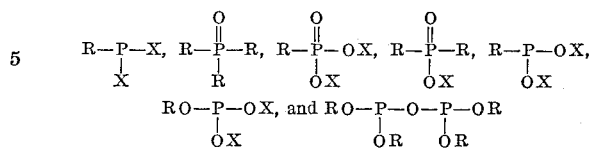

wherein R is phenyl or an alkyl radical of one to 6 carbon atoms and X is H or R.

4. The process of oxidizing butene to maleic anhydride which comprises contacting a gaseous mixture comprising butene, oxygen and an organo-phosphorus compound selected from the group consisting of

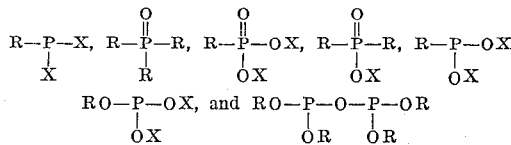

wherein R is phenyl or an alkyl radical of one to 6 carbon atoms and X is H or R at an elevated temperature in contact with a vanadium-phosphorus-oxygen catalyst having an atomic ratio of ½ to 3 atoms of phosphorus per atom of vanadium.

5. In a process for the vapor phase oxidation of hydrocarbons of 4 to 6 carbon atoms to maleic anhydride wherein the said hydrocarbon is contacted with a vanadium-phosphorus-oxygen catalyst in the form of discrete particles with the overall catalytic surface having an atomic ratio of about ½ to 3 atoms of phosphorus per atom of vanadium and wherein said catalyst gradually decreases in activity, the improvement which comprises substantially discontinuing the flow of said hydrocarbons and adding a gaseous stream comprising oxygen and an organo-phosphorus compound selected from the group consisting of

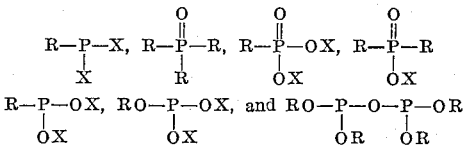

wherein R is phenyl or an alkyl radical of one to 6 carbon atoms and X is H or R.

6. In a process for the vapor phase oxidation of hydrocarbons of 4 to 6 carbon atoms to maleic anhydride wherein the said hydrocarbon is contacted with a vanadium-phosphorus-oxygen catalyst in the form of discrete particles with the overall catalytic surface having an atomic ratio of about ½ to 3 atoms of phosphorus per atom of vanadium and wherein said catalyst gradually decreases in activity, the improvement which comprises substantially discontinuing the flow of said hydrocarbons and adding a gaseous stream comprising oxygen and an organo-phosphorus compound selected from the group consisting of phosphites and thiophosphites.

7. The method of claim 1 wherein the said organo-phosphorus compound is dimethyl hydrogen phosphite.

References Cited by the Examiner

UNITED STATES PATENTS

| | | | |
|---|---|---|---|
| 2,625,519 | 1/1953 | Hartig | 260—346.8 |
| 2,773,921 | 12/1956 | Rylander et al. | 260—524 |
| 2,899,395 | 8/1959 | Buchner | 252—411 |
| 2,977,322 | 3/1961 | Varvel et al. | 252—411 |
| 2,989,545 | 6/1961 | Jewett | 260—346.8 |
| 2,995,580 | 8/1961 | Miller | 260—346.8 |
| 3,156,707 | 11/1964 | Kerr | 260—346.8 |

NICHOLAS S. RIZZO, *Primary Examiner.*

H. R. JILES, *Assistant Examiner.*